(12) United States Patent
Watanabe et al.

(10) Patent No.: US 12,214,647 B2
(45) Date of Patent: Feb. 4, 2025

(54) VEHICLE ELECTRIC FLUID MACHINE

(71) Applicant: KABUSHIKI KAISHA TOYOTA JIDOSHOKKI, Kariya (JP)

(72) Inventors: Ryuji Watanabe, Aichi-ken (JP);
Suehiro Fukazawa, Aichi-ken (JP);
Noritaka Nishimori, Aichi-ken (JP);
Takayuki Kato, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 233 days.

(21) Appl. No.: 17/683,709

(22) Filed: Mar. 1, 2022

(65) Prior Publication Data

US 2022/0305886 A1 Sep. 29, 2022

(30) Foreign Application Priority Data

Mar. 23, 2021 (JP) ................. 2021-048975

(51) Int. Cl.
*F16F 1/38* (2006.01)
*B60H 1/32* (2006.01)
*F04B 39/00* (2006.01)

(52) U.S. Cl.
CPC ......... *B60H 1/3229* (2013.01); *B60H 1/3222* (2013.01); *F04B 39/0044* (2013.01); *F16F 1/38* (2013.01); *B60H 2001/3292* (2013.01)

(58) Field of Classification Search
CPC .... F04B 39/0044; F04D 29/60; F04D 29/601; F16F 1/3835; F16F 1/3807; F16F 1/38; F16F 1/3732; F16F 1/376; F16F 1/3828; F16F 1/3814
See application file for complete search history.

(56) References Cited

U.S. PATENT DOCUMENTS 2,780,483 A * 2/1957 Kessler ............... F16L 19/0218
285/354
2,789,844 A * 4/1957 Kessler .................. F16L 23/22
285/365
(Continued)

FOREIGN PATENT DOCUMENTS

CN 111219315 A * 6/2020
JP 2000-130330 A 5/2000
(Continued)

*Primary Examiner* — Philip E Stimpert
(74) *Attorney, Agent, or Firm* — Sughrue Mion, PLLC

(57) ABSTRACT

A vehicle electric fluid machine includes: a housing provided with a mounting leg having an insertion hole; a fastener having a shaft portion inserted into the insertion hole and a head portion at one end of the shaft portion, the fastener fastening the other end of the shaft portion to a mounting object; a sleeve disposed between the mounting leg and the shaft portion, elastic vibration dampers disposed on opposite sides of the mounting leg in its axial direction, each of the elastic vibration dampers having a cylindrical portion disposed between an inner circumferential surface of the mounting leg and an outer circumferential surface of the sleeve, and a collar extending from one of opposite ends of the cylindrical portion in a radial outward direction of the cylindrical portion; and an annular plate through which the fastening force is applied to the mounting leg through the collar.

9 Claims, 5 Drawing Sheets

(56) References Cited

U.S. PATENT DOCUMENTS

| | | | | |
|---|---|---|---|---|
| 4,809,960 | A | * | 3/1989 | Kakimoto ................. F16F 1/38 403/228 |
| 5,979,910 | A | * | 11/1999 | Shinohara ........... F16L 27/0832 285/379 |
| 2011/0147150 | A1 | * | 6/2011 | Schillemeit ......... F04B 39/0044 188/378 |
| 2020/0032782 | A1 | * | 1/2020 | Resch .................. F25D 23/006 |

FOREIGN PATENT DOCUMENTS

| | | |
|---|---|---|
| JP | 2010-138808 A | 6/2010 |
| JP | 2013-132947 A | 7/2013 |
| JP | 2014-149029 A | 8/2014 |

* cited by examiner

VEHICLE ELECTRIC FLUID MACHINE

CROSS-REFERENCE TO RELATED APPLICATION

This application claims priority to Japanese Patent Application No. 2021-048975 filed on Mar. 23, 2021, the entire disclosure of which is incorporated herein by reference.

BACKGROUND ART

The present disclosure relates to a vehicle electric fluid machine.

A vehicle electric compressor, which is an example of a vehicle electric fluid machine, is mounted to a mounting object of a vehicle. For such mounting, a housing of the vehicle electric compressor has mounting legs. A fastener is inserted through each of the mounting legs and is fastened to a mounting object, thereby mounting the vehicle electric compressor to the mounting object. The vehicle electric compressor has an elastic vibration damper in order to prevent transmission of vibration caused by an operation of an electric motor of the vehicle electric compressor to the vehicle.

In a mounting structure of an electric compressor disclosed in Japanese Patent Application Publication No. 2010-138808, as illustrated in FIG. 9, a fastening bolt 92 serving as a fastener is inserted into a mounting leg 90 of the electric compressor and into a mounting member 91 positioned on an engine side. The fastening bolt 92 has a shaft portion 92a that is screwed into the mounting member 91. A first gap adjustment member 93 serving as an elastic vibration damper is disposed between a head portion 92b of the fastening bolt 92 and one end surface of the mounting leg 90, the first gap adjustment member 93 being pressed and plastically deformed by screwing the fastening bolt 92. A second gap adjustment member 94 serving as an elastic vibration damper is disposed between the other end surface of the mounting leg 90 and the mounting member 91, the second gap adjustment member 94 being pressed and plastically deformed by screwing the fastening bolt 92.

In the mounting structure of the electric compressor disclosed in Japanese Patent Application Publication No. 2010-138808, washers 95 are provided on opposite sides of the mounting leg 90, between the first gap adjustment member 93 and the head portion 92b and between the second gap adjustment member 94 and the mounting member 91, respectively. A collar portion 96 formed of a metal pipe is inserted into the mounting leg 90.

The first gap adjustment member 93 has a cylindrical portion 93a and a flanged portion 93b which are integrally formed with each other, and the second gap adjustment member 94 has a cylindrical portion 94a and a flanged portion 94b which are integrally formed with each other. The cylindrical portions 93a and 94a are arranged between an outer circumferential surface of the collar portion 96 and an inner circumferential surface of the mounting leg 90. The flanged portion 93b of the first gap adjustment member 93 is disposed between one of the washers 95 and one end surface of the mounting leg 90. The flanged portion 94b of the second gap adjustment member 94 is disposed between the other of the washers 95 and the other end surface of the mounting leg 90.

For vibration of the housing of the electric compressor, the flanged portions 93b and 94b damp a component of vibration in a direction parallel to an axial direction of the fastening bolt 92. The cylindrical portions 93a and 94a damp a component of vibration in a direction perpendicular to the axial direction of the fastening bolt 92.

Vibration of the housing of the electric compressor causes elastic deformation of the flanged portions 93b and 94b in the direction perpendicular to the axial direction of the fastening bolt 92. At this time, the larger elastic deformation of the flanged portions 93b and 94b in a radial outward direction of the flanged portion 93b and 94b is, the more stress concentration near a boundary between the flanged portion 93b and the cylindrical portion 93a and a boundary between the flanged portion 94b and the cylindrical portion 94a increases. This may result in damages to a part of the first gap adjustment member 93 near the boundary between the flanged portion 93b and the cylindrical portion 93a, and damages to a part of the second gap adjustment member 94 near the boundary between the flanged portion 94b and the cylindrical portion 94a.

SUMMARY

In accordance with an aspect of the present disclosure, there is provided a vehicle electric fluid machine including: a housing that accommodates an electric motor and has a mounting leg, the mounting leg having an insertion hole extending through end surfaces of the mounting leg in an axial direction of the mounting leg; a fastener that has a shaft portion inserted into the insertion hole and has a head portion at one end of the shaft portion, the fastener fastening the other end of the shaft portion to a mounting object so that the mounting leg is mounted to the mounting object; a sleeve that is disposed between the mounting leg and the shaft portion and that receives fastening force from the head portion, elastic vibration dampers disposed on opposite sides of the mounting leg in the axial direction of the mounting leg, each of the elastic vibration dampers having a cylindrical portion disposed between an inner circumferential surface of the mounting leg and an outer circumferential surface of the sleeve, and having a collar extending from one of opposite ends of the cylindrical portion in a radial outward direction of the cylindrical portion; and an annular plate through which the fastening force received by the sleeve is applied to the mounting leg through the collar. Each of the elastic vibration dampers is disposed in the mounting leg without adhering to the sleeve and the annular plate. The annular plate has a protrusion or a recess on a contact surface of the annular plate being in contact with the collar. The protrusion or the recess reduces elastic deformation of the collar in a radial outward direction of the collar.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of a vehicle electric compressor serving as a vehicle electric fluid machine with reference to FIG. 1 to FIG. 5. The vehicle electric compressor is used for a vehicle air conditioner.

Figure 1:
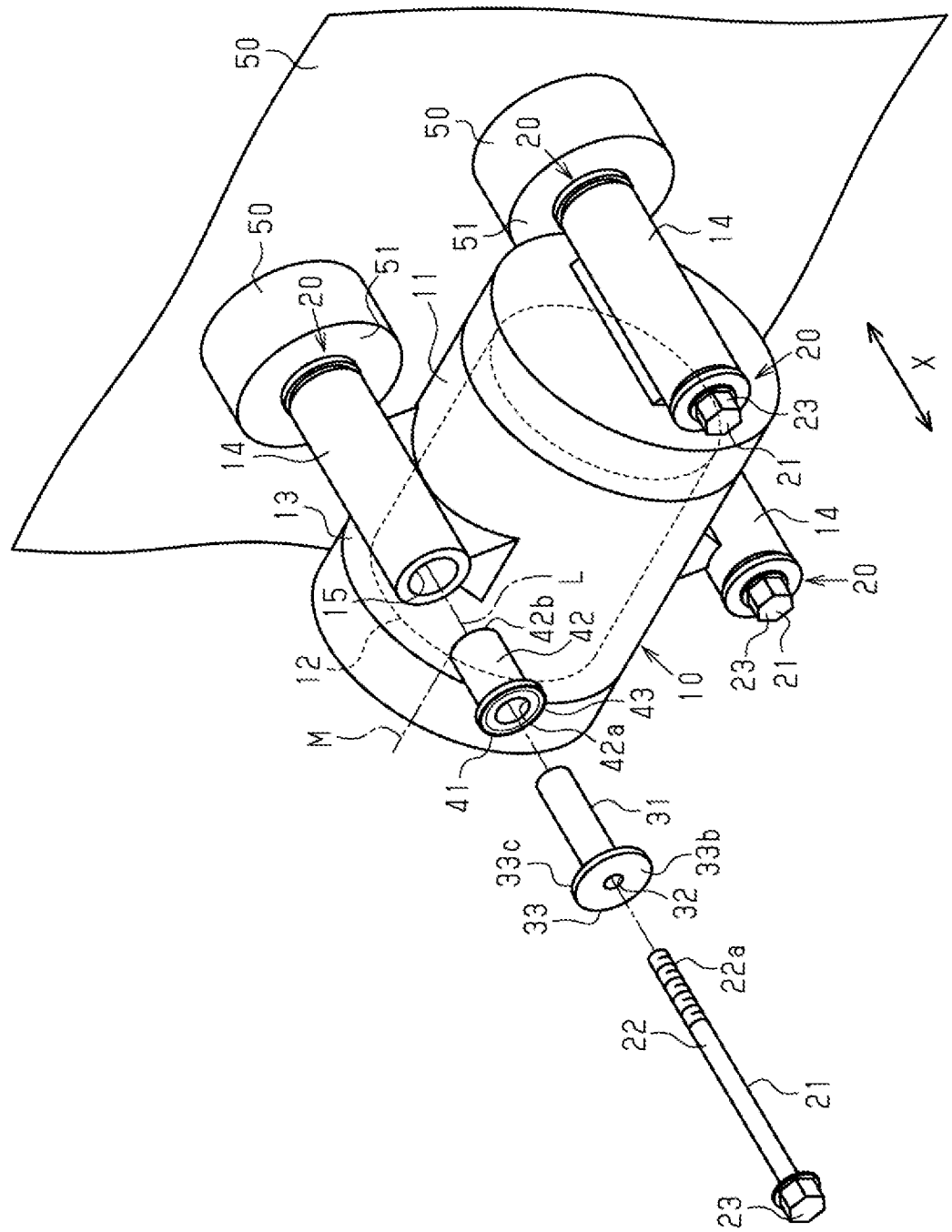
FIG. 1 is an exploded perspective view of a vehicle electric compressor and a vibration damping device.

As illustrated in FIG. 1, a vehicle electric compressor 10 includes a housing 11, an electric compression mechanism (not illustrated) including an electric motor 12, and vibration damping devices 20. The housing 11 has an accommodating portion 13 having a cylindrical shape and a plurality of mounting legs 14. The plurality of mounting legs 14 is for mounting the housing 11 to a mounting object 50 which is a part of a vehicle (not illustrated).

The accommodating portion 13 accommodates the electric compression mechanism including the electric motor 12. That is, the housing 11 accommodates the electric motor 12. The electric compression mechanism includes, in addition to the electric motor 12, a rotary shaft, a compression part connected to an end of the rotary shaft, and an inverter, which are not illustrated. The housing 11 has a suction port from which a refrigerant as fluid is drawn and a discharge port from which the refrigerant is discharged. The housing 11 supports the rotary shaft in a rotatable manner. In the electric compression mechanism, the rotary shaft is rotationally driven by the electric motor 12. Along with rotation of the rotary shaft, the refrigerant drawn into the housing 11 from the suction port of the housing 11 is compressed, and such a compressed refrigerant is discharged from the discharge port of the housing 11 to an outside of the housing 11.

The mounting legs 14 each have a cylindrical shape. The mounting legs 14 each have a central axis L whose extending direction corresponds to an axial direction X of each of the mounting legs 14. The central axis L of each of the mounting legs 14 is perpendicular to an axis M of the accommodating portion 13. The mounting legs 14 are disposed on the accommodating portion 13 so that central axes L of the mounting legs 14 are parallel to each other. Since the mounting legs 14 have the same configuration, one of the mounting legs 14 will be described, and two of the mounting legs 14 will not be described hereinafter.

Figure 2:
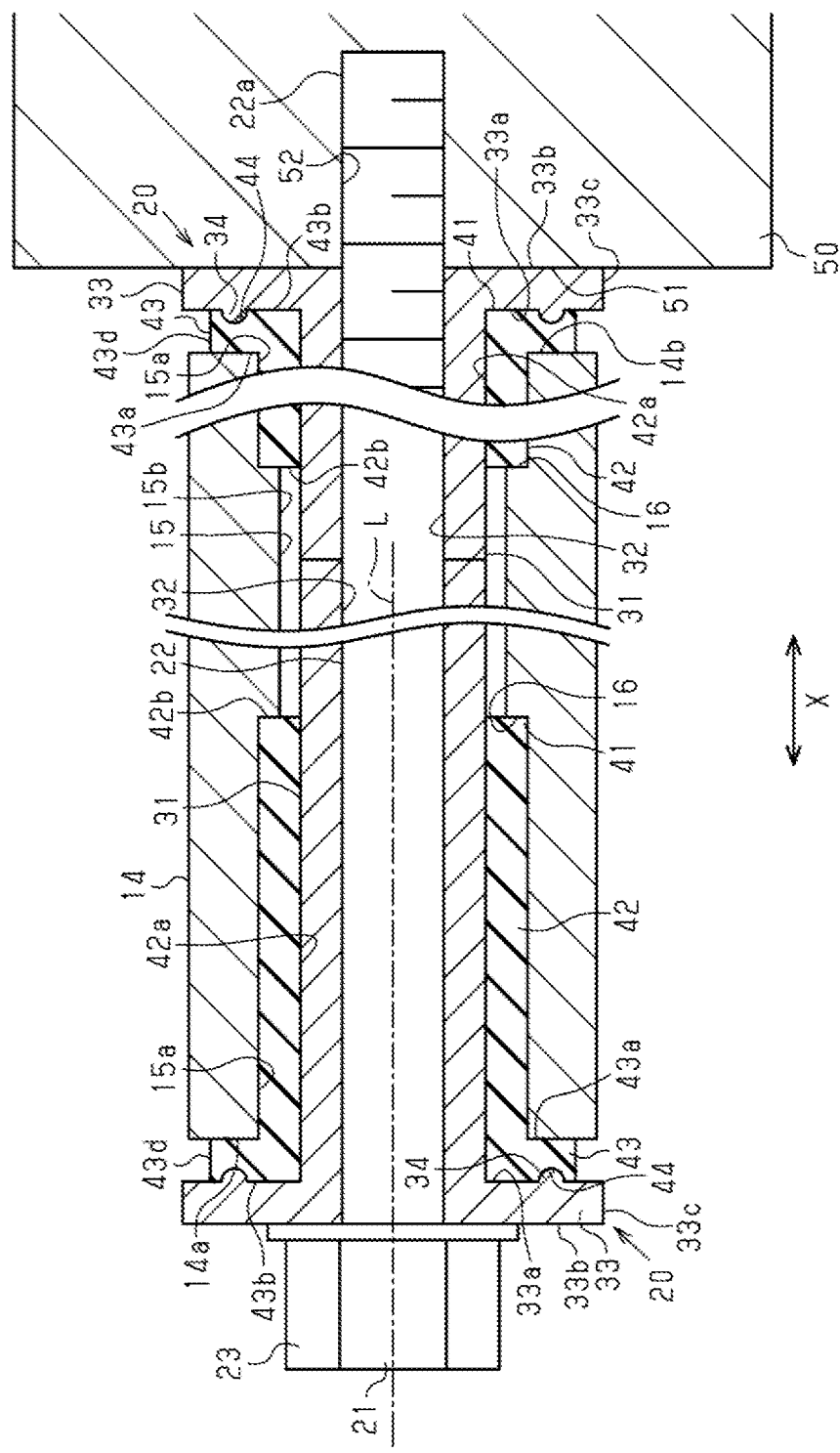
FIG. 2 is a cross-sectional view of a mounting structure of a mounting leg.

As illustrated in FIG. 2, the mounting leg 14 has an insertion hole 15. The insertion hole 15 extends through the mounting leg 14 in its axial direction X. The insertion hole 15 is formed of large diameter holes 15a positioned on opposite sides of the mounting leg 14 in its axial direction X and a small diameter hole 15b positioned between the large diameter holes 15a. The mounting leg 14 has annular surfaces 16 at opposite ends of the small diameter hole 15b. Each of the annular surfaces 16 connects an inner circumferential surface of each of the large diameter holes 15a and an inner circumferential surface of the small diameter hole 15b.

The mounting leg 14 has opposite end surfaces, a first end surface 14a and a second end surface 14b on opposite ends of the mounting leg 14 in the axial direction X. The first end surface 14a and the second end surface 14b each have an annular shape surrounding the insertion hole 15. Therefore, the mounting leg 14 has the insertion hole 15 extending through the first end surface 14a and the second end surface 14b.

The insertion hole 15 has its openings on the first end surface 14a and the second end surface 14b of the mounting leg 14. Each of the first end surface 14a and the second end surface 14b is a flat surface perpendicular to the central axis L of the mounting leg 14. The second end surface 14b of the mounting leg 14 is adjacent to the mounting object 50, so that the vehicle electric compressor 10 is mounted to the mounting object 50. The mounting object 50 has an internally threaded portion 52 extending in the axial direction X from an adjacent surface 51 adjacent to the second end surface 14b of the mounting leg 14.

Next, the vibration damping devices 20 provided on opposite ends of the mounting leg 14 will be described. One of the vibration damping devices 20 is provided on the first end surface 14a of the mounting leg 14, and the other of the vibration damping devices 20 is provided on the second end surface 14b of the mounting leg 14. The vibration damping devices 20 have the same structure. Thus, a configuration of one of the vibration damping devices 20 will be described, and the other of the vibration damping devices 20 will not be described.

Figure 3:
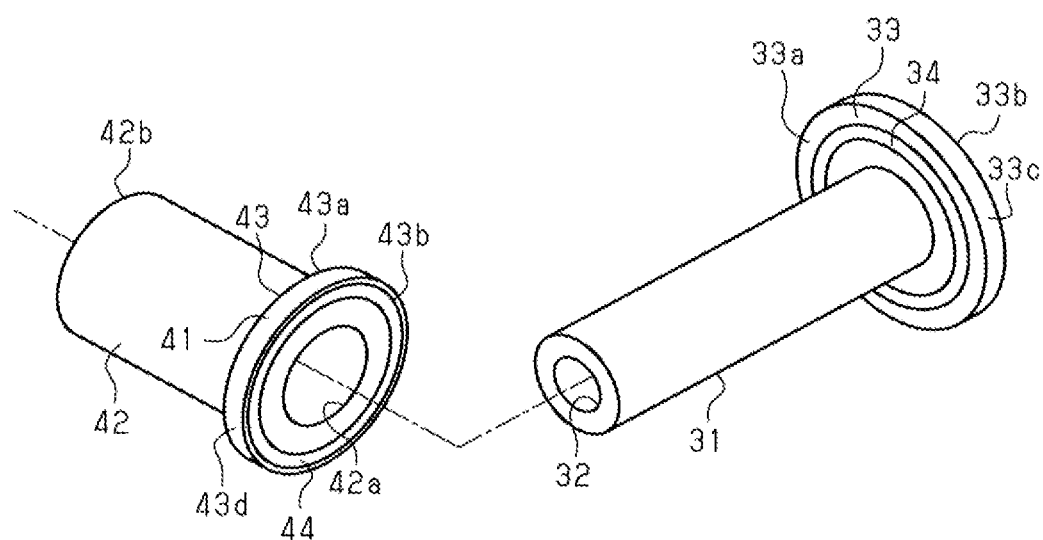
FIG. 3 is a perspective view of an elastic vibration damper and a sleeve.

As illustrated in FIG. 1, FIG. 2, and FIG. 3, a fastener 21 corresponding to a bolt is used to fasten the mounting leg 14 to the mounting object 50, thereby attaching the vibration damping devices 20 to the opposite ends of the mounting leg 14, respectively.

The fastener 21 is made of metal. The fastener 21 has a shaft portion 22 inserted into the insertion hole 15 and has a head portion 23 at one end of the shaft portion 22. The shaft portion 22 has an externally threaded portion 22a on an outer circumferential surface at the other end of the shaft portion 22. The externally threaded portion 22a at the other end of the shaft portion 22 is screwed into the internally threaded portion 52 of the mounting object 50, whereby the fastener 21 mounts the mounting leg 14 to the mounting object 50.

The vibration damping device 20 has a sleeve 31, a flange 33 serving as an annular plate, a protrusion 34, an elastic vibration damper 41, and a collar-side recess 44.

The sleeve 31 is made of metal. The sleeve 31 has a cylindrical shape. The sleeve 31 is integrally formed with the flange 33 made of metal. The flange 33 extends in a radial direction of the sleeve 31 from one of opposite ends of the sleeve 31 in its axial direction.

The sleeve 31 has an outer diameter that is smaller than a diameter of the small diameter hole 15b. The sleeve 31 is inserted into the insertion hole 15 of the mounting leg 14. The sleeve 31 has a sleeve hole 32. The sleeve hole 32 extends through the sleeve 31 in its axial direction. The shaft portion 22 of the fastener 21 is inserted into the sleeve hole 32. Thus, the shaft portion 22 of the fastener 21 is inserted through the sleeve 31. Therefore, the sleeve 31 is positioned between the outer circumferential surface of the shaft portion 22 and an inner circumferential surface of the mounting leg 14. That is, the sleeve 31 is positioned between the mounting leg 14 and the shaft portion 22.

The flange 33 having a disk shape has the sleeve hole 32 having its opening at the center of the flange 33. The flange 33 has opposite surfaces, a first contact surface 33a and a second contact surface 33b, in a thickness direction of the flange 33. The first contact surface 33a is an annular surface continuous with an outer circumferential surface of the sleeve 31. The second contact surface 33b is an annular surface positioned opposite to the first contact surface 33a. The first contact surface 33a and the second contact surface 33b are flat surfaces.

The protrusion 34 is formed on the first contact surface 33a of the flange 33. Thus, the protrusion 34 and the flange 33 are made of the same metal material. The protrusion 34 has a cylindrical shape concentric with the sleeve 31. The protrusion 34 is located radially inside an outer circumferential surface 33c of the flange 33.

Figure 4:
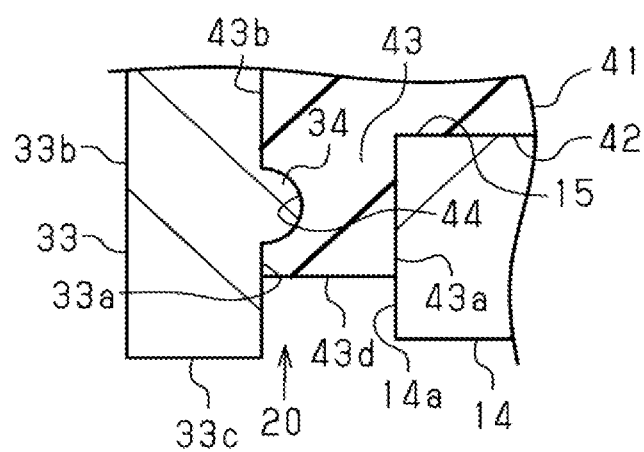
FIG. 4 is an enlarged view of a collar-side recess and a protrusion.

As illustrated in FIG. 4, a dimension of the protrusion 34 in a radial direction of the sleeve 31 is defined as a thickness of the protrusion 34. The thickness of the protrusion 34 is gradually tapered toward a distal end in a protruding direction of the protrusion 34 from the flange 33. The distal end of the protrusion 34 has a rounded shape. The dimension in which the protrusion 34 protrudes from the first contact surface 33a is smaller than a thickness of a collar 43 which will be described later.

The elastic vibration damper 41 is made of an elastic material. The elastic material is rubber, for example. The elastic vibration damper 41 damps vibration of the housing 11 caused by an operation of the electric motor 12, thereby preventing transmission of such vibration to the vehicle through the housing 11.

As illustrated in FIG. 2, FIG. 3, and FIG. 4, the elastic vibration damper 41 has a cylindrical portion 42, the collar 43 having a disk shape, and the collar-side recess 44. An outer diameter of the cylindrical portion 42 is smaller than a diameter of the large diameter hole 15a. An inner diameter of the cylindrical portion 42 is smaller than a diameter of the small diameter hole 15b. The elastic vibration damper 41 has an insertion hole 42a. The insertion hole 42a extends through the elastic vibration damper 41 in an axial direction of the cylindrical portion 42. The cylindrical portion 42 has a distal end surface 42b at one end of the cylindrical portion 42 in its axial direction, and the collar 43 is provided at the other end of the cylindrical portion 42 in its axial direction. A dimension of the cylindrical portion 42 in its axial direction is smaller than that of the sleeve 31 in its axial direction.

The collar 43 extends from the other end of the cylindrical portion 42 in its axial direction toward an outside of the cylindrical portion 42. The collar 43 has a disk shape and has the insertion hole 42a having its opening at the center of the collar 43. The collar 43 has opposite surfaces, a first holding surface 43a and a second holding surface 43b, in a thickness direction of the collar 43. The first holding surface 43a having an annular shape is continuous with an outer circumferential surface of the cylindrical portion 42. The first holding surface 43a is in contact with an end surface of the mounting leg 14. The second holding surface 43b having an annular shape is positioned opposite to the first holding surface 43a. The thickness of the collar 43 is set so as to absorb vibration of the housing 11.

As illustrated in FIG. 4, the second holding surface 43b of the collar 43 is recessed to form the collar-side recess 44. The protrusion 34 of the flange 33 is fitted into the collar-side recess 44. The collar-side recess 44 is an annular groove formed concentrically with the cylindrical portion 42. The collar-side recess 44 is located radially inside an outer circumferential surface 43d of the collar 43 and located radially outside an inner circumferential surface of the collar 43. The collar-side recess 44 is located radially outside the outer circumferential surface of the cylindrical portion 42.

The dimension of the collar-side recess 44 in a radial direction of the collar 43 is defined as a width of the collar-side recess 44. The width of the collar-side recess 44 becomes gradually narrower toward its distal end formed by recessing the second holding surface 43b. Thus, a bottom of the collar-side recess 44 has a rounded shape as viewed in a cross section of the collar-side recess 44 taken along the axial direction of the cylindrical portion 42.

The width of the collar-side recess 44 is the same as or slightly larger than the thickness of the protrusion 34, and a depth of the collar-side recess 44 from the second holding surface 43b is the same as or slightly larger than a protruding dimension of the protrusion 34. The depth of the collar-side recess 44 is set so that vibration of the vehicle electric compressor 10 can be absorbed by the collar 43 including the second holding surface 43b where the collar-side recess 44 is formed.

Next, a mounting structure of the mounting leg 14 provided with the vibration damping devices 20 will be described.

As illustrated in FIG. 2, on the second end surface 14b side of the mounting leg 14, the cylindrical portion 42 of the elastic vibration damper 41 is inserted into the large diameter hole 15a of the mounting leg 14. The distal end surface 42b of the cylindrical portion 42 is in contact with one of the annular surfaces 16 on the second end surface 14b side. The first holding surface 43a of the collar 43 is in contact with the second end surface 14b of the mounting leg 14. The outer circumferential surface 43d of the collar 43 is located radially inside the outer circumferential surface of the mounting leg 14.

The sleeve 31 is inserted into the insertion hole 42a of the elastic vibration damper 41. Thus, the cylindrical portion 42 of the elastic vibration damper 41 is disposed between the inner circumferential surface of the mounting leg 14 and the outer circumferential surface of the sleeve 31. The sleeve 31 is inserted through the distal end surface 42b of the cylindrical portion 42 and into an inner part of the mounting leg 14. The first contact surface 33a of the flange 33 is in contact with the second holding surface 43b of the collar 43. The elastic vibration damper 41 does not adhere to the sleeve 31 and the flange 33 to each other, and the elastic vibration damper 41, the sleeve 31 and the flange 33 are axially and radially movable. Thus, the elastic vibration damper 41 is disposed in the mounting leg 14 without adhering to the sleeve 31 and the flange 33.

In the mounting structure of the mounting leg 14, the shaft portion 22 of the fastener 21 is inserted through the sleeve 31 inside the mounting leg 14. The elastic vibration damper 41 is movable relative to the sleeve 31 and the flange 33.

The protrusion 34 protruding from the flange 33 is fitted into the collar-side recess 44 of the collar 43. The protrusion 34 is located radially outside the outer circumferential surface of the cylindrical portion 42, and protrudes toward the collar 43 along an axis of the cylindrical portion 42. The protrusion 34 is located radially inside the mounting leg 14. An outer circumferential surface of the protrusion 34 is in contact with an outer circumferential surface of the collar-side recess 44, and an inner circumferential surface of the protrusion 34 is in contact with an inner circumferential surface of the collar-side recess 44. A distal end surface of the protrusion 34 is in contact with a bottom surface of the collar-side recess 44. The second contact surface 33b of the flange 33 is in contact with the adjacent surface 51 of the mounting object 50.

On the first end surface 14a side, the cylindrical portion 42 of the elastic vibration damper 41 is inserted into the large diameter hole 15a of the mounting leg 14. The distal end surface 42b of the cylindrical portion 42 is in contact with the other of the annular surfaces 16 on the first end surface 14a side. The first holding surface 43a of the collar 43 is in contact with the first end surface 14a of the mounting leg 14. The outer circumferential surface 43d of the collar 43 is located radially inside the outer circumferential surface of the mounting leg 14.

The sleeve 31 is inserted into the insertion hole 42a of the elastic vibration damper 41. Thus, the cylindrical portion 42 of the elastic vibration damper 41 is disposed between the inner circumferential surface of the mounting leg 14 and the outer circumferential surface of the sleeve 31. The sleeve 31 is inserted through the distal end surface 42b of the cylindrical portion 42 and into the inner part of the mounting leg 14. The first contact surface 33a of the flange 33 is in contact with the second holding surface 43b of the collar 43.

Two sleeves 31 are inserted into the mounting leg 14 from the first end surface 14a side and from the second end surface 14b side, respectively, and respective distal end surfaces of the two sleeves 31 are in contact with each other inside the mounting leg 14. The elastic vibration damper 41 does not adhere to the sleeve 31 and the flange 33 to each other, and the elastic vibration damper 41, the sleeve 31 and the flange 33 are axially and radially movable to each other.

In the mounting structure of the mounting leg 14, the shaft portion 22 of the fastener 21 is inserted through the sleeve 31 inside the mounting leg 14. The elastic vibration damper 41 is movable relative to the sleeve 31 and the flange 33.

The protrusion 34 protruding from the flange 33 is fitted into the collar-side recess 44 of the collar 43. The protrusion 34 is located radially outside the outer circumferential surface of the cylindrical portion 42, and protrudes toward the collar 43 along the axis of the cylindrical portion 42. The protrusion 34 is located radially inside the mounting leg 14. The outer circumferential surface of the protrusion 34 is in contact with the outer circumferential surface of the collar-side recess 44, and the inner circumferential surface of the protrusion 34 is in contact with the inner circumferential surface of the collar-side recess 44. The distal end surface of the protrusion 34 is in contact with the bottom surface of the collar-side recess 44.

The two sleeves 31 each have a sleeve hole 32 into which the shaft portion 22 of the fastener 21 is inserted. The externally threaded portion 22a of the shaft portion 22 is screwed into the internally threaded portion 52 of the mounting object 50 to be fastened to the mounting object 50. The sleeve 31 receives fastening force from the head portion 23 of the fastener 21. Such fastening force received by the sleeve 31 is applied to the mounting leg 14 through the flange 33 and the collar 43. As a result, the fastening force from the head portion 23 causes the elastic vibration damper 41 to be pressed in its axial direction.

The first holding surface 43a is in contact with the first end surface 14a or the second end surface 14b, and the second holding surface 43b is in contact with the first contact surface 33a of the flange 33. The collar 43 is held between the mounting leg 14 and the flange 33 in the axial direction X, and receives stress in the axial direction X. The cylindrical portion 42 receives stress between the annular surface 16 and the flange 33 in the axial direction X of the mounting leg 14.

The protrusion 34 of the flange 33 is pressed into the collar-side recess 44. The protrusion 34 is formed on the first contact surface 33a corresponding to a contact surface of the flange 33 being in contact with the collar 43. The outer circumferential surface of the protrusion 34 is pressed against the outer circumferential surface of the collar-side recess 44, and the inner circumferential surface of the protrusion 34 is pressed against the inner circumferential surface of the collar-side recess 44. The distal end surface of the protrusion 34 is pressed against the bottom surface of the collar-side recess 44.

Next, operations of the vehicle electric compressor 10 will be described.

In the housing 11 of the vehicle electric compressor 10, vibration is caused by an operation of the electric motor 12. During such vibration in the housing 11, the cylindrical portion 42 and the collar 43 of the elastic vibration damper 41 damp a component of vibration in a direction parallel to an axial direction of the fastener 21. The cylindrical portion 42 damps a component of vibration in a direction perpendicular to the axial direction of the fastener 21. This can prevent transmission of the vibration of the vehicle electric compressor 10 to the mounting object 50.

When the elastic vibration damper 41 receives the above-described components of vibration, the collar 43 receives stress between the flange 33 and the first end surface 14a of the mounting leg 14, which causes elastic deformation of the collar 43. At this time, the collar-side recess 44 is in contact with the protrusion 34, which reduces elastic deformation of the collar 43 in its radial outward direction, in a part of the elastic vibration damper 41 inside a fitted portion of the protrusion 34 being fitted into the collar-side recess 44. That is, the flange 33 has the protrusion 34 on the contact surface of the flange 33 being in contact with the collar 43, the protrusion 34 reducing elastic deformation of the collar 43 in its radial outward direction.

The following effects can be obtained according to the present embodiment.

(1) The flange 33 has the protrusion 34, and the collar 43 has the collar-side recess 44. When the elastic vibration damper 41 receives the components of vibration, the protrusion 34 fitted into the collar-side recess 44 reduces excessive elastic deformation of the collar 43 in its radial outward direction. This results in reduction of stress concentration generated near a boundary between the cylindrical portion 42 and the collar 43, and results in reduction of damage near the boundary between the cylindrical portion 42 and the collar 43. As a result, durability deterioration due to damage to the elastic vibration damper 41 can be reduced.

(2) The protrusion 34 has an annular shape. Thus, the elastic vibration damper 41 has the fitted portion of the protrusion 34 being fitted into the collar-side recess 44, the fitted portion extending along an entire circumference of the elastic vibration damper 41. Accordingly, in the elastic vibration damper 41, elastic deformation of the collar 43 in its radial outward direction can be reduced throughout an entire circumference of the collar 43. As a result, localized elastic deformation of the collar 43 can be reduced.

(3) The flange 33 has the protrusion 34, and the collar 43 has the collar-side recess 44. The protrusion 34 made of metal is hardly deformed even when the protrusion 34 is subjected to elastic deformation of the collar 43 in its radial outward direction. This can suitably reduce elastic deformation of the collar 43 in its radial outward direction.

(4) The distal end of the protrusion 34 and the bottom of the collar-side recess 44 each have a rounded shape. Thus, stress concentration hardly occurs in the collar-side recess 44 when the collar 43 is elastically deformed, which can reduce damage near the collar-side recess 44.

(5) The elastic vibration damper 41 does not adhere to the sleeve 31 and the flange 33. This eliminates a process in which the elastic vibration damper 41 is vulcanized and adheres to the sleeve 31 and the flange 33, thereby saving a cost of the vehicle electric compressor 10. Since the elastic vibration damper 41 does not adhere to the sleeve 31 and the flange 33, a contact of the collar-side recess 44 with the protrusion 34 reduces elastic deformation of the collar 43 in its radial outward direction on reception of the components of vibration by the elastic vibration damper 41. This can reduce durability deterioration due to damage to the elastic vibration damper 41 while saving the cost of the vehicle electric compressor 10.

(6) The flange 33 has the protrusion 34 and is integrally formed with the sleeve 31. Accordingly, the sleeve 31 and the flange 33 having the protrusion 34 are positioned in the mounting leg 14 only by inserting the sleeve 31 into the insertion hole 15 of the mounting leg 14. Thus, the sleeve 31 and the flange 33 are easily positioned in the mounting leg 14 as compared with a configuration in which the sleeve 31 and the flange 33 having the protrusion 34 are individually provided in the mounting leg 14.

(7) The protrusion 34 is positioned radially outside the outer circumferential surface of the cylindrical portion 42 and radially inside the mounting leg 14. Accordingly, the protrusion 34 of the flange 33 can be suitably in contact with the collar 43 when the fastening force from the head portion 23 of the fastener 21 is applied to the mounting leg 14 through the sleeve 31 and the collar 43. This can reduce elastic deformation of the collar 43 in its radial outward direction.

The above-described embodiment can be modified and implemented as follows. The above-described embodiment and the following modified embodiments can be implemented in combination with each other to the extent that there is no technical contradiction.

Figure 5:
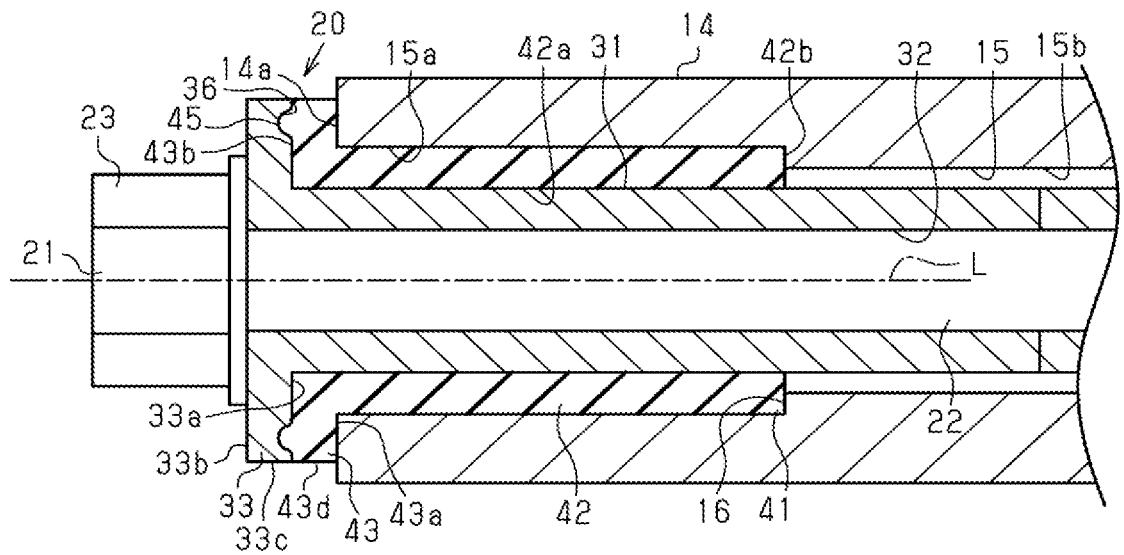
FIG. 5 is a cross-sectional view of a vibration damping device of a modified embodiment.

As illustrated in FIG. 5, a collar 43 has a collar-side protrusion 45 that is located radially outside an outer circumferential surface of a cylindrical portion 42, and located radially inside a mounting leg 14, the collar-side protrusion 45 protruding toward a flange 33. The flange 33 may have a recess 36 into which the collar-side protrusion 45 is fitted. In this case, a boundary between the first contact surface 33a of the flange 33 and an inner circumferential surface of the recess 36 preferably has a smoothly curved shape. The collar-side protrusion 45 preferably has an annular shape.

In this configuration, since the collar-side protrusion 45 is included in a part of an elastic vibration damper 41, the collar-side protrusion 45 is also made of an elastic material, thereby increasing the volume of the elastic vibration damper 41. This improves a vibration damping effect of the elastic vibration damper 41.

When the elastic vibration damper 41 receives components of vibration, the collar 43 tends to be elastically deformed in its radial outward direction. At this time, the boundary between the first contact surface 33a of the flange 33 and the inner circumferential surface of the recess 36 has the smoothly curved shape, which can reduce stress concentration generated near a proximal end of the collar-side protrusion 45, and can reduce damage to and abrasion of the collar 43 due to a contact with the first contact surface 33a of the flange 33.

Figure 6:
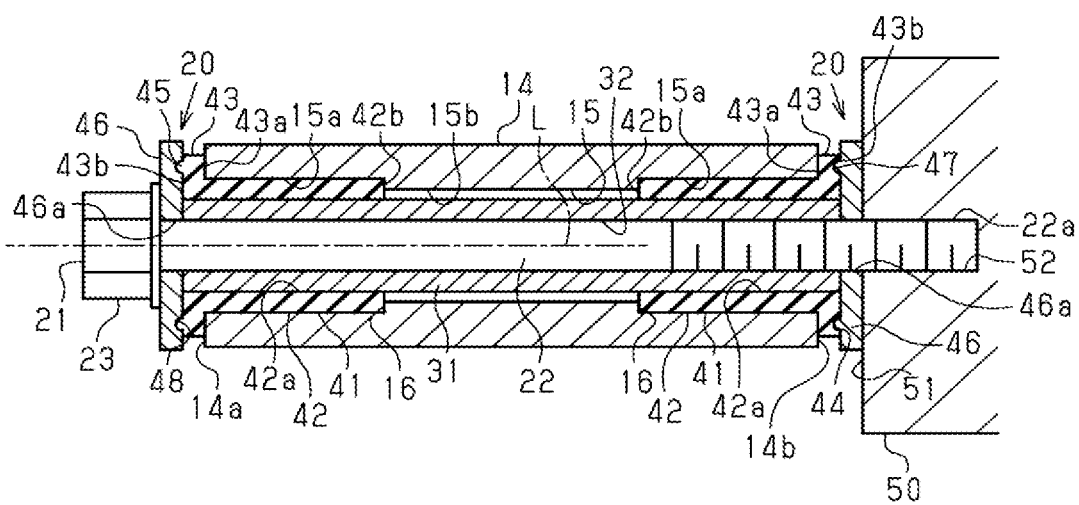
FIG. 6 is a cross-sectional view of a vibration damping device of a modified embodiment.

As illustrated in FIG. 6, a flange 33 may be eliminated from a sleeve 31; instead, washers 46 may each serve as an annular plate. In this case, one of the washers 46 is disposed between a head portion 23 and one end surface of the sleeve 31 in its axial direction, and the other of the washers 46 is disposed between a mounting object 50 and the other end surface of the sleeve 31 in its axial direction. In this case, the washers 46 allows fastening force, which is received by the sleeve 31 from the head portion 23, to be applied to a mounting leg 14 through the sleeve 31 and a collar 43.

The other of the washers 46 provided on a second end surface 14b side has a protrusion 47 on a contact surface of the other of the washers 46 being in contact with the collar 43. The washers 46 each have, in its central portion, a through hole 46a into which a shaft portion 22 of a fastener 21 is inserted. The protrusion 47 is located radially inside an outer circumferential edge of the other of the washers 46, radially outside an outer circumferential surface of the cylindrical portion 42, and radially inside the mounting leg 14. The protrusion 47 may annularly extend along an entire circumference of the other of the washers 46, or a plurality of protrusions 47 may be spaced therebetween along a circumferential direction of the other of the washers 46. One of collars 43 provided on a second end surface 14b has a collar-side recess 44 into which the protrusion 47 is fitted. On the other hand, the other of the collars 43 provided on a first end surface 14a side may have a collar-side protrusion 45, and the other of the washers 46 may have a recess 48.

Figure 7A:
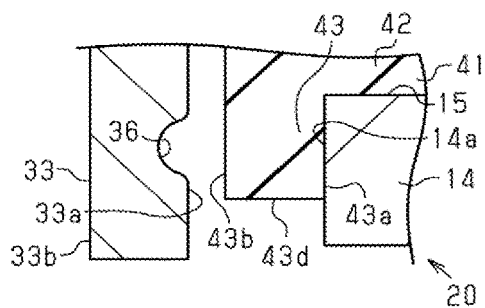
FIG. 7A is a cross-sectional view of a flange and a collar before fastening by a fastener.
Figure 7B:
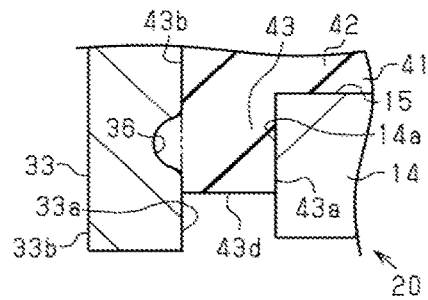
FIG. 7B is a cross-sectional view of the flange and the collar after fastening by the fastener.

As illustrated in FIG. 7A, a first contact surface 33a of a flange 33 has a recess 36. A second holding surface 43b that is a contact surface of a collar 43 being in contact with the flange 33 is defined as a flat surface. As illustrated in FIG. 7B, in a mounting structure of a mounting leg 14, the second holding surface 43b is elastically deformed along a recess 36 when the collar 43 is held between the flange 33 and the mounting leg 14. Such elastic deformation of the second holding surface 43b allows the recess 36 of the flange 33 to reduce elastic deformation of the collar 43 in its radial outward direction on a contact surface of the flange 33 being in contact with the collar 43. Accordingly, the collar 43 may have a collar-side protrusion to be fitted into the recess 36.

In this configuration, when an elastic vibration damper 41 receives components of vibration, the collar 43 receives stress between the flange 33 and the mounting leg 14 in the axial direction X of the mounting leg 14. At this time, fitting of the collar-side protrusion into the recess 36 allows the collar 43 to be in contact with the flange 33, thereby reducing excessive elastic deformation of the collar 43 in its radial outward direction.

Thus, the flange 33 and the elastic vibration damper 41 are easily assembled to each other, as compared with a case in which the flange 33 and the elastic vibration damper 41 are assembled to each other so that the collar-side protrusion formed in the flange 33 is fitted into the recess 36 formed in the collar 43.

Figure 8A:
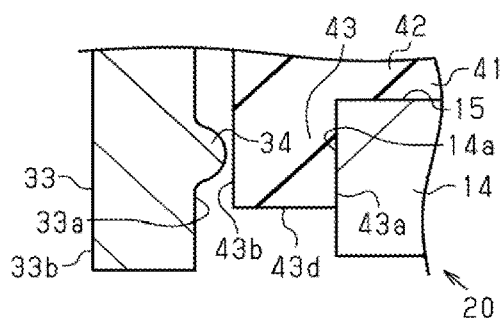
FIG. 8A is a cross-sectional view of a flange and a collar before fastening by a fastener.
Figure 8B:
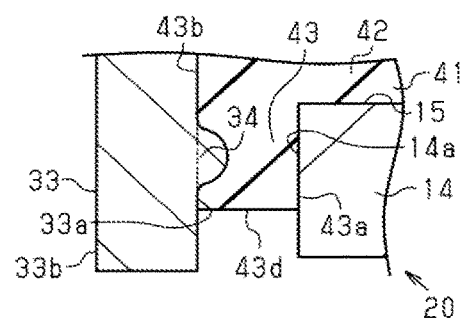
FIG. 8B is a cross-sectional view of the flange and the collar after fastening by the fastener.
Figure 9:
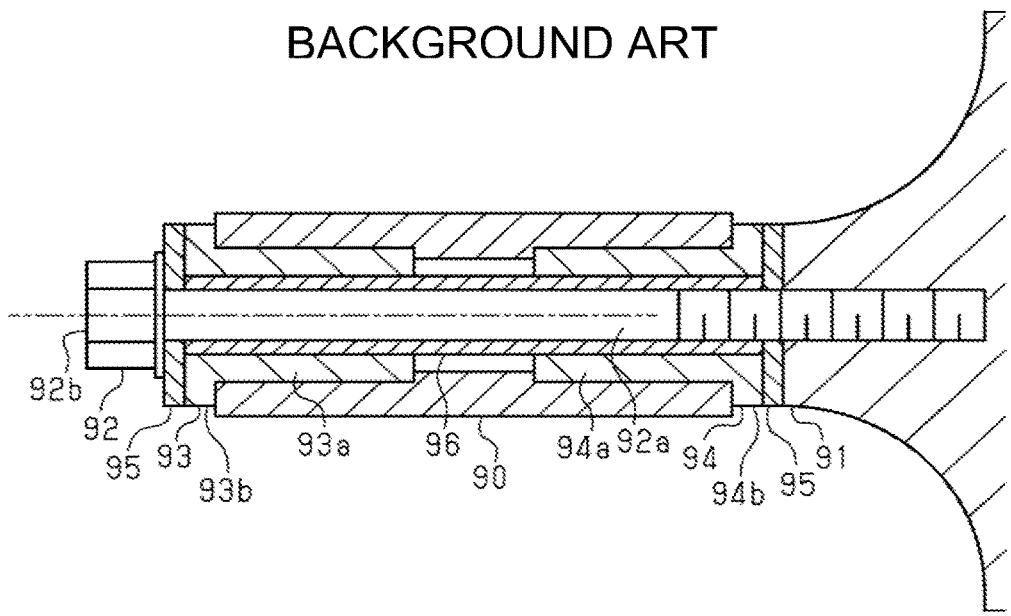
FIG. 9 is a drawing of a background art of the present disclosure.

As illustrated in FIG. 8A, a protrusion 34 is formed on a first contact surface 33a of a flange 33. A second holding surface 43b corresponding to a contact surface of a collar 43 being in contact with the flange 33 is defined as a flat surface. As illustrated in FIG. 8B, in a mounting structure of a mounting leg 14, the second holding surface 43b is elastically deformed along the protrusion 34 when the collar 43 is held between the flange 33 and the mounting leg 14. Such elastic deformation of the second holding surface 43b allows the protrusion 34 of the flange 33 to reduce elastic deformation of the collar 43 in its radial outward direction on the contact surface of the flange 33 being in contact with the collar 43. Accordingly, the collar 43 may have a collar-side recess to be fitted into the protrusion 34.

In this configuration, when an elastic vibration damper 41 receives components of vibration, the collar 43 receives stress between the flange 33 and the mounting leg 14 in the axial direction X of the mounting leg 14. At this time, fitting of the protrusion 34 into the collar-side recess allows the collar 43 to be in contact with the flange 33, thereby reducing excessive elastic deformation of the collar 43 in its radial outward direction.

Thus, the flange 33 and the elastic vibration damper 41 are easily assembled to each other, as compared with a case in which the flange 33 and the elastic vibration damper 41 are assembled to each other so that the protrusion 34 formed in the flange 33 is fitted into the collar-side recess formed in the collar 43.

The flange 33 may have a plurality of protrusions 34 spaced therebetween along a circumferential direction of the flange 33, and the collar 43 may have a plurality of collar-side recesses 44 into which the protrusions 34 are fitted respectively, the plurality of collar-side recesses 44 spaced therebetween along a circumferential direction of the collar 43. In this case, the protrusions 34 and the collar-side recesses 44 may have any shape.

The vehicle electric compressor 10 may compress fluid other than a refrigerant, such as air.

The vehicle electric fluid machine is not limited to be used for the vehicle electric compressor 10 including a compression part that compresses fluid. For example, when the vehicle electric fluid machine is mounted on a fuel cell vehicle, the vehicle electric fluid machine may be an electric pump system including a pump that supplies hydrogen to a fuel cell and a vehicle electric motor that drives the pump.

What is claimed is:

1. A vehicle electric fluid machine comprising:
    a housing that accommodates an electric motor and has a mounting leg, the mounting leg having an insertion hole extending through end surfaces of the mounting leg in an axial direction of the mounting leg;
    a fastener that has a shaft portion inserted into the insertion hole and a head portion at one end of the shaft portion, the fastener fastening the other end of the shaft portion to a mounting object so that the mounting leg is mounted to the mounting object;
    a sleeve that is disposed between the mounting leg and the shaft portion and that receives a fastening force from the head portion;
    elastic vibration dampers disposed on opposite sides of the mounting leg in the axial direction of the mounting leg, each of the elastic vibration dampers having a cylindrical portion disposed between an inner circumferential surface of the mounting leg and an outer circumferential surface of the sleeve, and a collar extending from one of opposite ends of the cylindrical portion in a radial outward direction of the cylindrical portion; and
    an annular plate through which the fastening force received by the sleeve is applied to the mounting leg through the collar, wherein the collar and the cylindrical portion are monolithically formed, wherein the annular plate and the sleeve are monolithically formed, wherein
    each of the elastic vibration dampers is disposed in contact with the mounting leg and in non-adhering contact with the sleeve and the annular plate, and
    the annular plate has a protrusion or a recess on a contact surface of the annular plate being in contact with the collar, the protrusion or the recess is located radially inside an outer circumferential surface of the collar and located radially outside an outer circumferential surface of the cylindrical portion, the protrusion or the recess reducing elastic deformation of the collar in a radial outward direction of the collar.

2. The vehicle electric fluid machine according to claim 1, wherein
    the protrusion or the recess has an annular shape.

3. The vehicle electric fluid machine according to claim 1, wherein
    the collar has a collar-side recess into which the protrusion is fitted, or a collar-side protrusion that is fitted into the recess.

4. The vehicle electric fluid machine according to claim 3, wherein
    the annular plate has the protrusion,
    the annular plate is made of metal, and
    the collar has the collar-side recess into which the protrusion is fitted.

5. The vehicle electric fluid machine according to claim 3, wherein
    the annular plate has the recess, and
    the collar has the collar-side protrusion fitted into the recess.

6. The vehicle electric fluid machine according to claim 1, wherein
    a contact surface of the collar being in contact with the annular plate is a flat surface, and
    the contact surface is elastically deformed along the protrusion or the recess.

7. The vehicle electric fluid machine according to claim 1, wherein
    the protrusion or the recess is located radially inside the mounting leg.

8. The vehicle electric fluid machine according to claim 1, wherein
    the sleeve and the annular plate are integrally formed with each other.

9. The vehicle electric fluid machine according to claim 1, wherein the contact surface of the annular plate is in contact with the collar in the axial direction, and an outer circumferential surface of the annular plate is located radially outside the outer circumferential surface of the collar.

* * * * *